United States Patent
Ford

(10) Patent No.: US 6,695,497 B2
(45) Date of Patent: *Feb. 24, 2004

(54) PRINT HEAD TRANSPORT MECHANISM

(75) Inventor: Thomas David Reid Ford, Royston (GB)

(73) Assignee: Neopost Limited, Romford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/098,423

(22) Filed: Mar. 18, 2002

(65) Prior Publication Data

US 2002/0114656 A1 Aug. 22, 2002

Related U.S. Application Data

(63) Continuation of application No. 09/375,560, filed on Aug. 17, 1999, now Pat. No. 6,447,183.

(30) Foreign Application Priority Data

Aug. 18, 1998 (GB) .............................................. 9818026

(51) Int. Cl.⁷ .............................................. B41J 25/304
(52) U.S. Cl. ........................ 400/320; 400/59; 400/139; 400/323; 400/352; 400/355
(58) Field of Search ............................ 400/139, 55, 56, 400/59, 320, 323, 352, 355

(56) References Cited

U.S. PATENT DOCUMENTS

| | | |
|---|---|---|
| 2,913,090 A | 11/1959 | Tholstrup |
| 4,049,109 A | 9/1977 | Plaza et al. |
| 4,077,336 A | 3/1978 | Talvard et al. |
| 4,365,901 A | 12/1982 | Haubrich et al. |
| 4,774,529 A | 9/1988 | Paranjpe et al. |
| 5,733,055 A | 3/1998 | Hiramatsu et al. |
| 5,762,428 A | 6/1998 | Cordery et al. |
| 5,889,535 A | 3/1999 | Jackson et al. |
| 5,975,778 A | 11/1999 | Kanemitsu |
| 6,447,183 B2 * | 9/2002 | Ford .......................... 400/320 |

FOREIGN PATENT DOCUMENTS

| | | |
|---|---|---|
| DE | 3125426 | 1/1983 |
| DE | 3213646 | 10/1983 |
| EP | 0827839 | 3/1998 |
| GB | 2319991 | 6/1998 |
| JP | 09-254489 | 9/1997 |
| JP | 10-337862 | 12/1998 |

* cited by examiner

Primary Examiner—Daniel J. Colilla
Assistant Examiner—Jill E Culler
(74) Attorney, Agent, or Firm—Shoemaker and Mattare

(57) ABSTRACT

A print head transport mechanism of a postage meter for printing postal indicia which are of greater height than a printing height of a print head comprises a carriage to traverse the print head in a first direction over a band of a print receiving area and a guide to displace the print head from a home position to an index position during a second traverse of the print head in a reverse direction whereby the print head traverses over a second band, adjacent the first band, of the print receiving area during the second traverse.

15 Claims, 4 Drawing Sheets

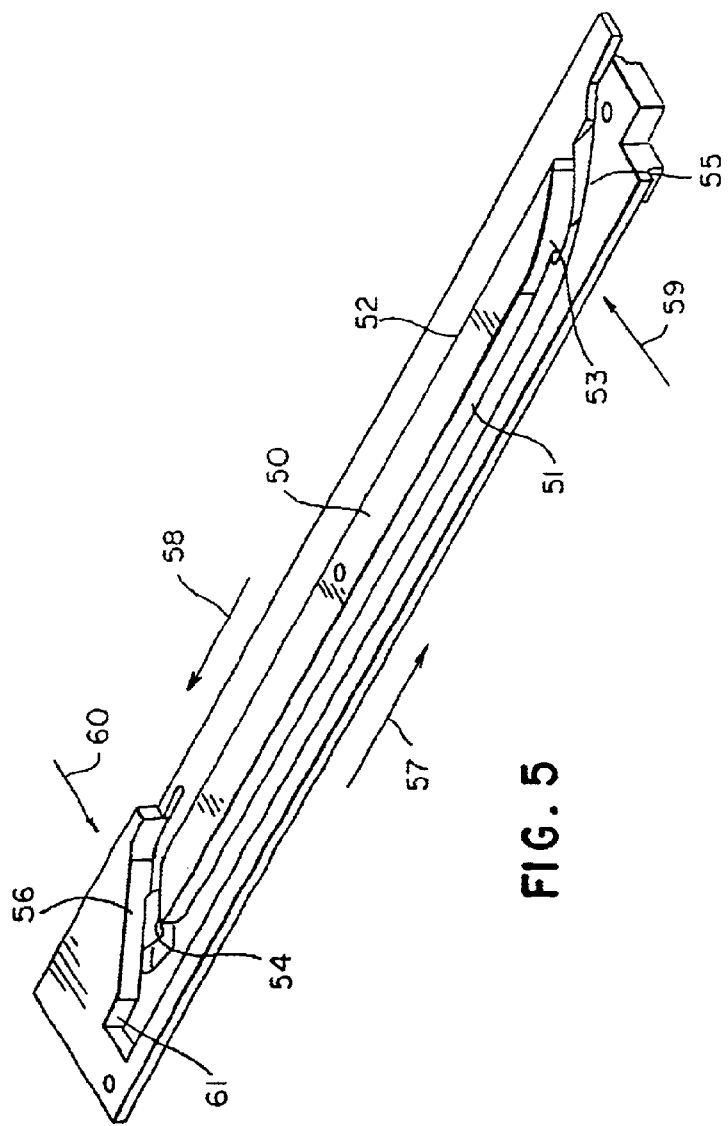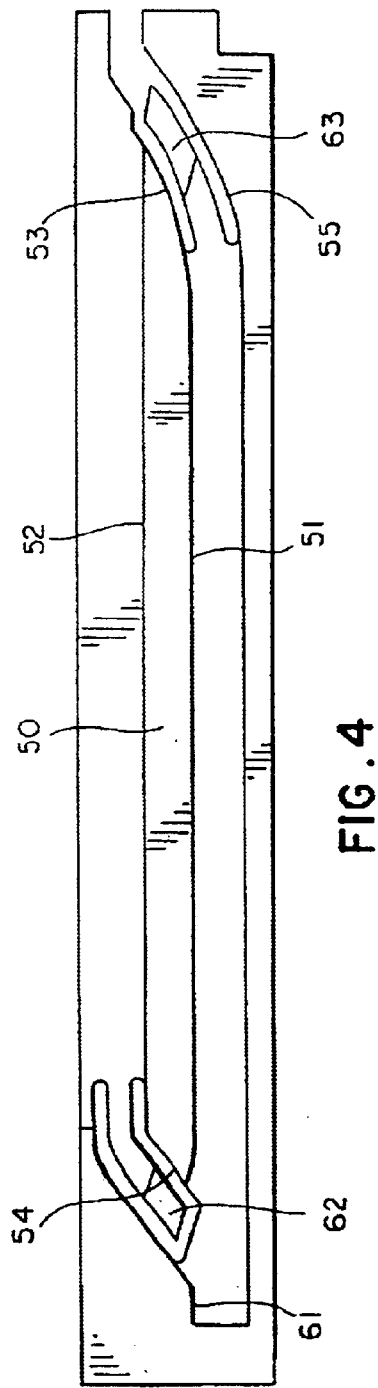

PRINT HEAD TRANSPORT MECHANISM

This application is a continuation of U.S. Ser. No. 09/375560, filed Aug. 17, 1999 now U.S. Pat. No. 6,441,183.

BACKGROUND OF THE INVENTION

This invention relates to transport mechanisms for moving a print head relative to a print receiving medium.

Print head transport mechanisms are known in which a digital print head is traversed alternately in opposite directions across the width of a print receiving medium. Such mechanisms are used in computer output printers in which a plurality of lines of printing are effected on a sheet of paper. After a traverse of the print head across the print receiving medium in which a line of printing is effected, the print receiving medium is fed, in a direction perpendicular to the traverse of the print head, so as to move the line of printing away from alignment with the line of traverse of the print head and to bring an unprinted portion of the print receiving medium into alignment with the traverse of the print head. The print heads may be impact wire dot print heads, ink jet print heads, thermal print heads or other types of print head in which a plurality of print elements are selectively operated to effect printing. The wires of the impact wire dot print heads are aligned in a row and likewise the ink jet print heads include a plurality of ink jet nozzles aligned in a row and thermal print heads include a plurality of thermal printing elements aligned in a row. Selective actuation of the wires, nozzles or thermal printing elements enables printing of dots of ink at selected positions aligned with the row of print elements. The traverse of the print head is perpendicular to the row of print elements and hence, as is well known, selective actuation of the print elements during traverse of the print head is effective to print desired characters and patterns on the print receiving medium. It will be appreciated that the maximum height of character that can be printed in a traverse of the print head is determined by the length of the row of print elements.

It is proposed to use ink jet print heads for printing postal indicia on mail items. However the required height of the postal indicia is greater than the length of the row of ink jet nozzles in commonly commercially available ink jet print heads.

SUMMARY OF THE INVENTION

According to the invention a print head transport mechanism includes a carriage mounted on a chassis for traversal relative to said chassis in a first direction and in a second direction opposite to said first direction over and beyond a print receiving area; means for driving the carriage alternately in said first and second directions; a sub-carriage for mounting a print head, said sub-carriage being mounted on said carriage for traversal relative to the carriage in a third direction substantially parallel to said print receiving area and transverse to said first and second directions; a guide mounted on the chassis; means on the sub-carriage engaging with said guide; said guide having a formation such as to maintain the sub-carriage in a first index position when the carriage is traversed in the first direction, to maintain the sub-carriage in a second index position displaced from the first index position when the carriage is traversed in the second direction, to effect traverse of the sub-carriage from said first index position to said second index position each time the carriage is traversed in said first direction beyond the print receiving area and to effect traverse of the sub-carriage from said second index position to said first index position each time the carriage is traversed in said second direction beyond the print receiving area.

BRIEF DESCRIPTION OF THE DRAWING

An embodiment of the invention will be described hereinafter by way of example with reference to the drawings in which:

FIG. 4 is a plan view of a modified guide plate, and

FIG. 5 is a perspective view of the modified guide plate.

DESCRIPTION OF THE PREFERRED EMBODIMENT

Figure 1:
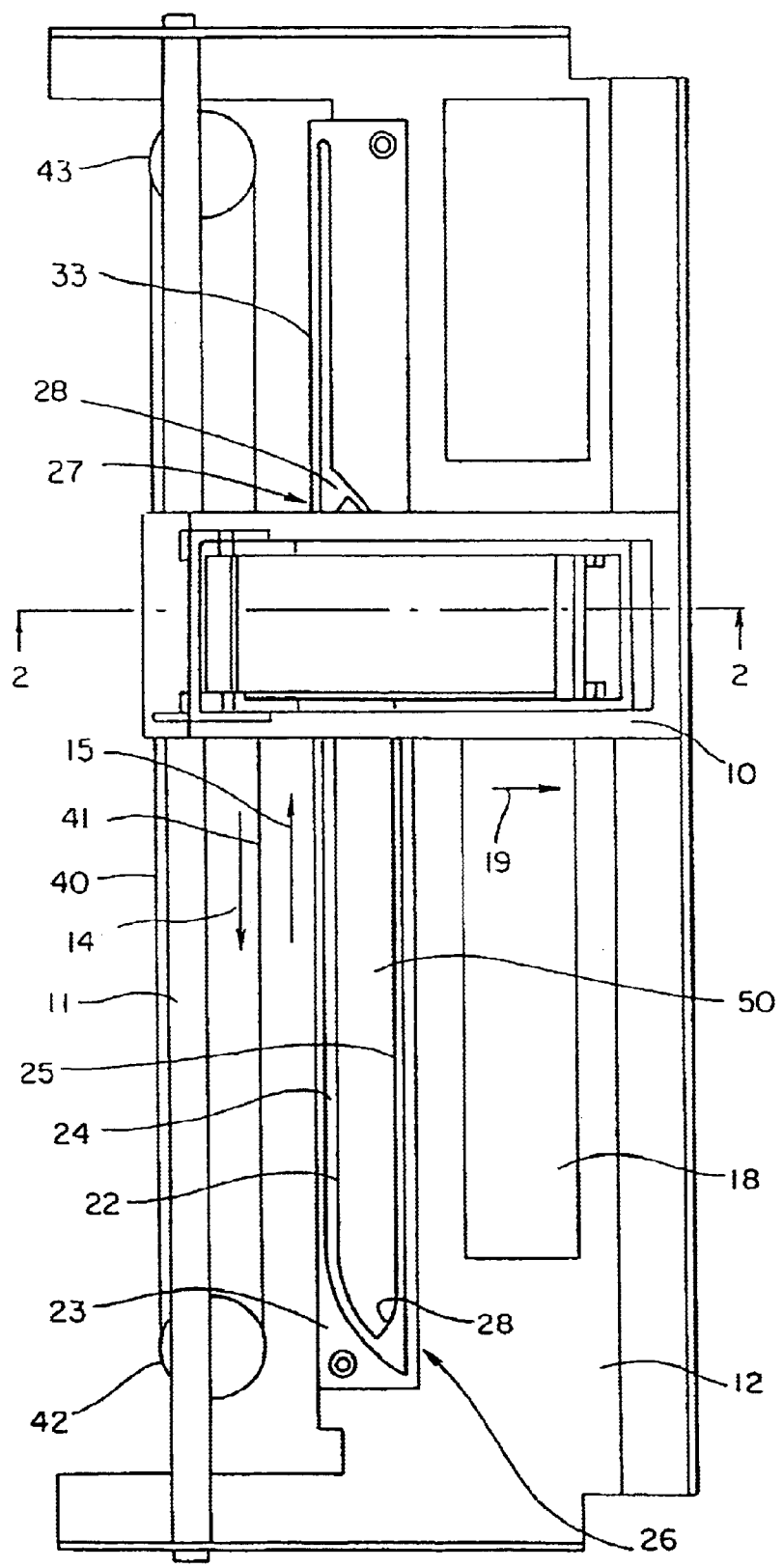
FIG. 1 is a plan view of a print head transport mechanism.
Figure 2:
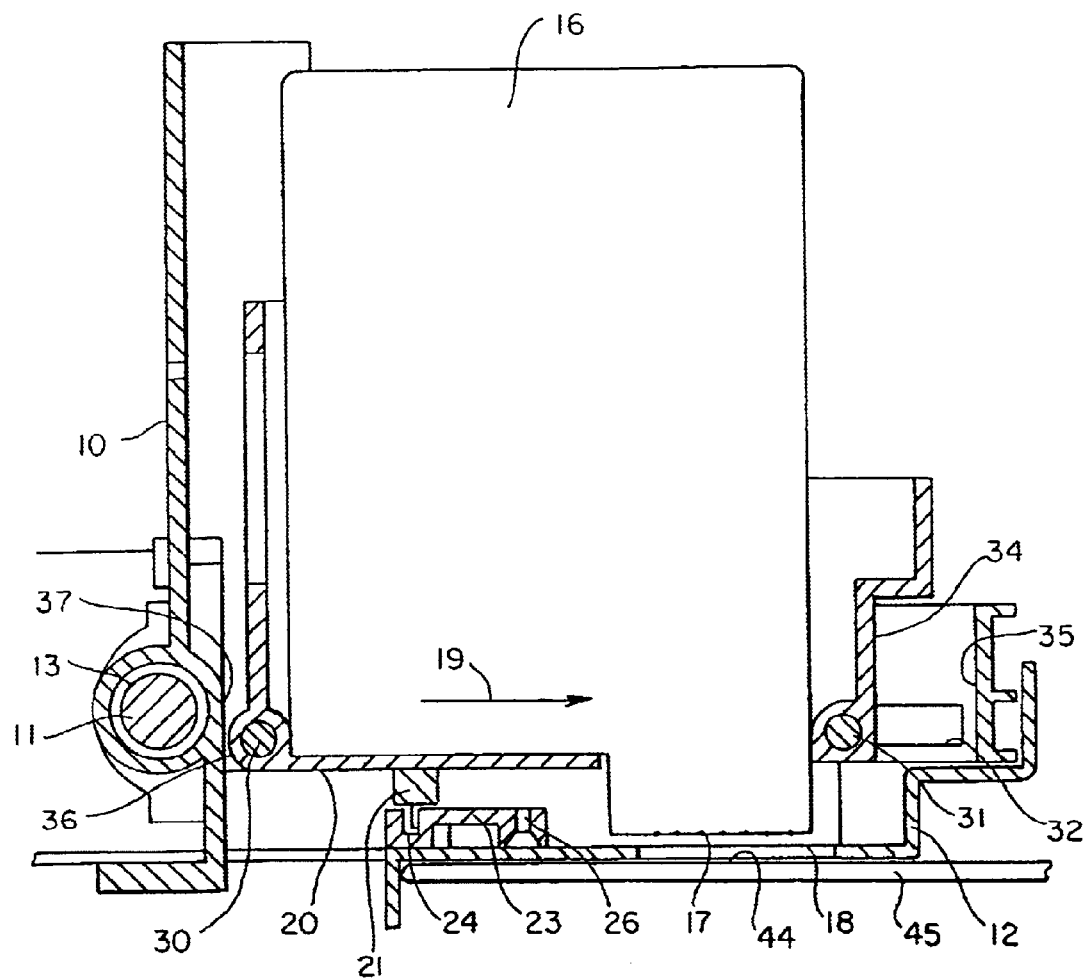
FIG. 2 a sectional view on line 2—2 of the mechanism shown in FIG. 1.

Referring to FIGS. 1 and 2 of the drawings, a carriage 10 is mounted on a guide rod 11 supported on a chassis 12. The carriage 10 is slidingly mounted by means of a bearing 13 on the guide rod 11 to permit the carriage to traverse lengthwise along the guide rod in the directions indicated by arrows 14, 15. The carriage may be traversed along the guide rod by any suitable drive means. For example, as shown on FIG. 1 a belt 40 may be provided that has a portion 41 thereof extending parallel to the guide rod. The belt passes around a drive pulley 42 and a resiliently mounted tension pulley 43 maintains the belt in tension. The drive pulley is driven from a shaft of a drive motor. The carriage 10 is secured to the portion 41 of the belt that extends parallel to the guide rod. When the drive motor is powered to rotate in one direction the carriage is traversed in the direction of arrow 14. Similarly when the drive motor is powered to rotate in an opposite direction the carriage is traversed in the direction of arrow 15.

An ink jet print head 16 is releasably mounted on the carriage. The print head 16 includes a line of ink jet nozzles indicated at 17 (FIG. 2). The ink jet nozzles are directed to eject droplets of ink through an aperture 18 in the chassis 12 toward a print receiving area 44 of a mail item 45 located below the chassis. The line of ink jet nozzles extends transversely to the direction of traverse of the carriage 10 and hence during traverse of the carriage the ink jet nozzles are traversed over a strip of the mail item.

Figure 3:
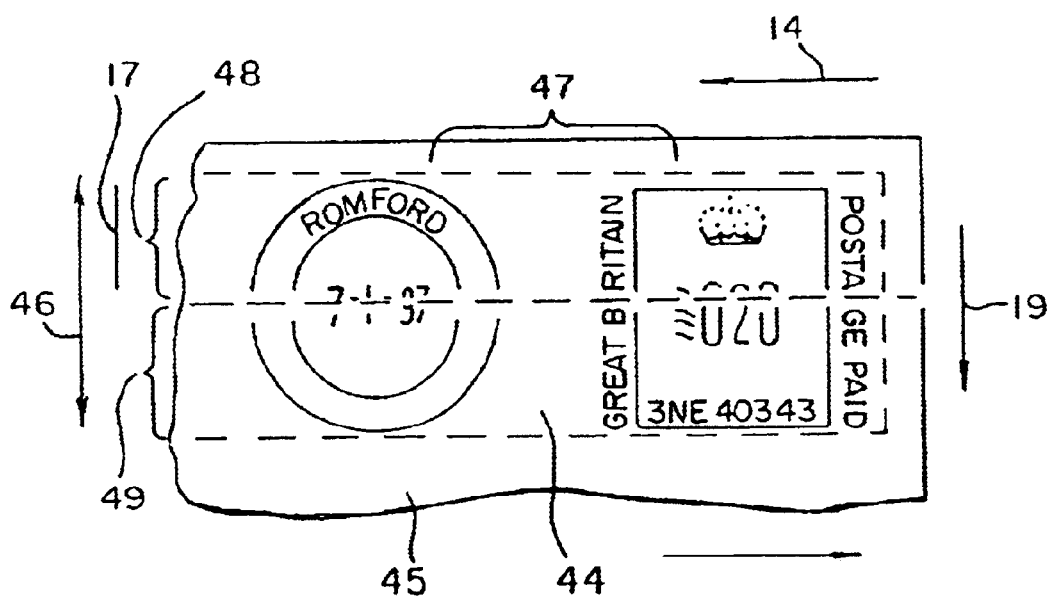
FIG. 3 illustrates printing a postal indicium in two traverses of a print head.

Referring now to FIG. 3, the required transverse dimension 46 of a postal indicium 47 to be printed on a mail piece 45 by the print head 16 is greater than the length of the line of ink jet nozzles 17. Accordingly the postal indicium is printed during two traverses of the print head. In a first traverse of the print head, for example in the direction of arrow 14, the line of ink jet nozzles are aligned with and traverse a first strip 48 of the print receiving area 44 in which the indicium is to be printed and then prior to a second traverse of the print head in the opposite direction, the print head is displaced in a direction, orthogonal to the traversing of the carriage 10 in the directions of arrows 14, 15, indicated by arrow 19 to align the ink jet nozzles with a second immediately adjacent strip 49 of the print receiving area 44 in which the indicium 47 is to be printed. Thus during the first traverse of the print head a first band of the indicium is printed and in the second traverse of the print head a second band, immediately adjacent the first band, of the indicium is printed. It is to be understood that the postal indicium illustrated in FIG. 3 is a postal indicia currently in use in the United Kingdom and is shown merely by way of example and that the printing apparatus may be used to print other desired forms of postal indicia.

A mechanism for indexing displacement of the print head as referred to hereinbefore will now be described. The carriage 10 carries a sub-carriage 20 which is mounted on the carriage to permit indexing traversal of the sub-carriage relative to the carriage 10 from a home position to an index position in the direction of arrow 19 and return of the sub-carriage to the home position in a direction opposite to that of arrow 19. Conveniently the sub-carriage 20 may be mounted on the carriage 10 for traversal relative to the carriage by means of studs 30, 31 on the sub-carriage 20 engaging in slots, of which one slot 32 receiving the stud 31 is shown.

Indexing traversal of the sub-carriage is effected by means of a pin 21 on the sub-carriage 20 engaging with a track 22 of a guide plate 23 secured to the chassis 12. The track 22 comprises a groove having two branches 24, 25 extending parallel to one another and offset relative to one another in a direction parallel to the arrow 19. At junctions 26, 27 beyond the area in which printing is to be effected the two branches 24, 25 join together thereby forming a continuous loop track and the branch 24 has an extension 33 beyond the junction 27. At the junction 26 the track branch 24 is of arcuate form to join with the end of branch 25 and at the junction 27 the track branch 25 is of arcuate form to join into branch 24. When the carriage is traversed in the direction of arrow 14, the pin 21 is engaged in the track branch 24 and the sub-carriage is maintained in a home position. As the carriage nears the end of branch 24, the pin 21 enters the arcuate portion of the branch 24 and as a result the pin 21 is moved transversely to the end of track branch 25. Transverse movement of the pin 21 into track branch 25 causes a corresponding indexing displacement of the sub-carriage from the home position to an index position. The drive to the carriage is then reversed and the pin 21 travels along the track branch 25 to maintain the sub-carriage in the second index position. As the carriage nears the end of branch 25, the pin 21 enters the arcuate end portion of the branch 25 and as a result the pin is moved transversely and is returned to the track branch 24. This transverse movement of the pin into track branch 24 causes a corresponding indexing displacement of the sub-carriage from the index position back to the home position. At the locations adjacent the junctions where the track branches join, the wall of the groove forms a cam surface 28. When traversal of the carriage in a given direction is started, the cam surface 28 acts to guide the pin 21 into that one of the track branches along which the pin is required to travel. The extension 33 of track branch 24 beyond the junction 27 of the two track branches permits the carriage to be traversed out of and beyond the printing region into a service station for the print head.

The relative transverse offset of the track branches 24, 25 may be equal to an offset required to provide the intended indexing traverse of the sub-carriage. However, if the location of the print head in a transverse direction is directly dependent upon the engagement between the pin 21 and the walls of the groove track, tolerances in manufacture of the track 22 and wear of the walls of the groove track of the pin 21 would result in imprecise positioning of the print head. Accordingly it is preferred to mount the pin 22 on the sub-carriage 20 with a freedom of movement in the direction of indexing traversal of the sub-carriage and the pin 21 is spring biased to a central position. The transverse offset of the track branches is slightly greater than would be required to provide the intended index traversal of the sub-carriage and hence the engagement of the pin 21 in the grooved track causes the pin to be displaced against the spring biassing to an extent slightly greater than required to cause the intended indexing displacement of the sub-carriage. The indexing displacement of the sub-carriage is limited by abutments to precisely locate the sub-carriage at either the home or index positions. Hence the pin is displaced against spring force relative to the sub-carriage and thereby maintains the sub-carriage under spring force against one or other of the limit abutments. As seen in FIG. 2, the sub-carriage has a home position in which abutment of a face 36 of the sub-carriage 20 and a face 37 of the carriage 10 precisely locates the sub-carriage. Indexing displacement of the sub-carriage from the home position in the direction of arrow 19 may be limited by abutment of a face 34 of the sub-carriage 20 against a face 35 of the carriage 10 whereby the sub-carriage is precisely located in the index position. Alternatively the location of the sub-carriage in the home and index positions may be determined by engagement of a stud in a slot of precise length, for example by engagement of the stud 31 in the slot 32, the ends of the slot being precisely located so as to precisely determine the required locations of the sub-carriage in the home and index positions.

Instead of the pin having limited movement relative to the sub-carriage and being acted on by a spring to ensure that the sub-carriage is displaced into a limit position determined by position determining means comprising the faces on the sub-carriage and carriage or by the stud and the slot, other position determining means for example a detent mechanism may be provided to ensure displacement of the sub-carriage to precisely determined home and index positions.

Thus in operation of the print head to print a postal indicium, with the sub-carriage located in the home position, the carriage is traversed in a first direction in the direction of arrow 14 and the ink jet nozzles are operated selectively to print a first band of the postal indicium. At a position of the carriage beyond the printing area the pin 21 is caused by the arcuate form of the track branch 24 to traverse across to the track branch 25 and thereby indexes the sub-carriage from the home position to the index position. The traverse of the carriage is then reversed and during traverse of the printing area the ink jet nozzles are again selectively operated to print a second band of the postal indicium immediately adjoining the first band. At a position of the carriage beyond the printing area the pin 21 follows the end of track branch 25 into track branch 24 and thereby traverses the sub-carriage back to the home position thereof.

It will be appreciated that with the pin 21 spring biassed relative to the sub-carriage, the pin is urged into engagement with one side wall of the guide track and hence the track branches 24, 25 may be constituted by side walls of a guide island 50 of the guide plate 23. Accordingly the guide plate may have a construction illustrated in FIGS. 4 and 5 to which reference will now be made.

The guide island 50 has side walls 51, 52 which extend parallel to one another and are spaced from one another by a distance slightly greater than required for displacing the sub-carriage from the home position to the index position and from the index position to the home position. Ends 53, 54 of the guide island side walls 51, 52 are shaped to permit the guide pin of the sub-carriage to move from engagement with that one of the walls 51, 52 with which the pin has been engaged during a traverse of the carriage in a first direction into a position where the pin can move into engagement with the other one of the side walls during a next succeeding traverse of the carriage in a reverse direction. Cam walls 55, 56 are provided at the ends of the guide plate. When the carriage is traversed in a direction indicated by arrow 57 with the pin on the sub-carriage engaging the guide wall 51, toward the end of that traverse the pin on the sub-carriage comes into engagement with the cam wall 55 and as a result the pin is urged in the direction of arrow 59 and the sub-carriage is moved from a home position to an index position. In a traverse of the carriage in a reverse direction indicated by arrow 58, the pin engages with the guide wall 52 and maintains the sub-carriage in the index position. Similarly toward the end of traverse in the direction of arrow 58 the pin comes into engagement with the call wall 56 and as a result the pin is urged in the direction of arrow 60 and the sub-carriage is moved from the index position to the home position. At the end of traverse of the carriage in the direction of arrow 58, the pin engages a guide wall 61 to maintain the sub-carriage in the home position at a print head maintenance station. It will be appreciated that operation of the guide plate illustrated in FIGS. 4 and 5 in co-operation with the pin of the sub-carriage is substantially the same as operation of the guide plate 23 of FIG. 1.

A detent or other means may be provided effective to maintain the sub-carriage in the home and index positions.

If the displacement of the sub-carriage from the home to the index position and from the index position to the home position is substantially in a horizontal direction the sub-carriage will tend to remain in either the home or the index position to which it has been displaced when the carriage is at either end of its traverse and the pin is not in engagement with a guide wall 51 or 52. However if the apparatus is subjected to sudden shock or if the direction of displacement is an angle to the horizontal the sub-carriage may tend to move away from the home or index position to which is has been moved by the guide plate. Accordingly it is desirable to provide means to retain the sub-carriage in the home and index positions and for preventing, at the start of a traverse of the carriage, displacement of the sub-carriage back to the home or index position of the preceding traverse. Spring flaps 62, 63 are provided in the guide plate. The spring flaps normally project in the path of travel of the pin. At the start of a traverse of the carriage in direction of arrow 57, the pin is prevented by the flap 62 from moving back to the index position into engagement with guide wall 52 and is constrained to move into engagement with the guide wall 51. Similarly at the start of a traverse of the carriage in direction of arrow 58, the pin is prevented by the flap 63 from moving back to the home position into engagement with guide wall 51 and is constrained to move into engagement with the guide wall 52. At the end of the traverses of the carriage when the pin is displaced by engagement with the cam wall 55 or 56 respectively, resilience of the flaps permits the pin to pass over the flaps.

The pin may be a non-rotatable member which slides in engagement with the guide and cam walls or, preferably, is a rotatable roller.

The print head transport mechanism has been described hereinbefore for traversing and indexing an ink jet print head relative to an area of a mail item to receive an imprint of a postal indicia. It is to be understood that the transport mechanism may also be used for similarly traversing and indexing other forms of print head where the impression required to be printed is of greater width than the span of the printing elements of the print head. For example the transport mechanism may be used for traversing and indexing wire dot impact, thermal, magnetic and other types of print head. The print head may be utilised for printing a composite pattern, for example a postal indicium in two traverses or may be used for printing other imprints which have a dimension greater than the span of the print head elements.

The extent of traverse of the sub-carriage between the home and index positions may be approximately equal to the span of the printing elements of the print head whereby an impression having a width equal to twice the span of the printing elements may be printed. Alternatively if the width of the required impression is less than twice the span of the printing elements the printing head may be indexed to a lesser extent such that the strips of the printing area traversed by the printing elements overlap. Preferably those ones of the printing elements that traverse the region of the overlap are operated in such a manner that there is no overlap in the printing that is effected by the printing elements.

I claim:

1. A print head transport mechanism, including:
    a chassis;
    a carnage mounted on said chassis for traversal relative to said chassis in first and second opposite directions over and beyond a print-receiving area;
    a drive unit operable to traverse said carnage alternately in said first and second directions;
    a sub-carriage for supporting a print head, said sub-carriage being movably mounted on said carriage for traversal relative to said carriage between first and second index positions in a third direction substantially parallel to said print-receiving area and transverse to said first and second directions;
    a displacement member connected to said sub-carriage; and
    a guide mounted on said chassis, said guide being operative to engage said displacement member such as to maintain said sub-carriage in said first index position when said carriage is traversed in said first direction and said second index position when said carriage is traversed in said second direction, and effect traversal of said sub-carriage from said first index position to said second index position each time said carnage is traversed in said first direction beyond said print-receiving area and from said second index position to said first index position each time said carriage is traversed in said second direction beyond said print-receiving area.

2. A print head transport mechanism as claimed in claim 1 wherein said guide includes a first branch track defined by a first guide wall and operative to engage said displacement member to maintain said sub-carriage in said first index position during traversal of said carnage in said first direction and a second branch track defined by a second guide wall and operative to engage said displacement member to maintain said sub-carriage in said second index position during traversal of said carnage in said second direction.

3. A print head transport mechanism as claimed in claim 2, wherein said displacement member is resiliently connected to said sub-carriage and said first and second guide walls are located such that said sub-carriage is maintained in respective ones of said first and second index positions by said resilient connection of said displacement member and said sub-carriage.

4. A print head transport mechanism as claimed in claim 3, wherein said first and second index positions are determined by engagement of first position determining means on said sub-carriage and second position determining means on said carriage.

5. A print head transport mechanism as claimed in claim 2, wherein said first and second index positions are determined by engagement of first position determining means on said sub-carnage and second position determining means on said carnage.

6. A print head transport mechanism as claimed in claim 2, wherein said first branch track is operative to cause traversal of said sub-carriage from said first index position to said second index position following traversal of said carriage over said print-receiving area in said first direction, and said second branch track is operative to cause traversal of said sub-carriage from said second index position to said first index position following traversal of said carriage over said print-receiving area in said second direction.

7. A print head transport mechanism as claimed in claim 2, wherein said guide includes first guide means operative to guide said displacement member to said second branch track in changing said direction of traverse of said carriage from said first direction to said second direction.

8. A print head transport mechanism as claimed in claim 7, wherein said guide includes second guide means operative to guide said displacement member to said first branch track in changing said direction of traverse of said carriage from said second direction to said first direction.

9. A print head transport mechanism as claimed in 2, wherein said guide includes a first cam wall located adjacent an end of said traverse of said carriage in said first direction and operative to engage said displacement member to move said sub-carnage from said first index position to said second index position, and a second cam wall located adjacent an end of said traverse of said carriage in said second direction and operative to engage said displacement member to move said sub-carriage from said second index position to said first index position.

10. A print head transport mechanism as claimed in claim 2, including first stop means operative to ensure said displacement member moves into engagement with said first guide wall following traversal of said carriage in said second direction and prior to traversal of said carriage in said first direction over said print-receiving area.

11. A print head transport mechanism as claimed in claim 10, including: second stop means operative to ensure said displacement member moves into engagement with said second guide wall following traversal of said carriage in said first direction and prior to traversal of said carriage in said second direction over said print-receiving area.

12. A print head transport mechanism as claimed in claim 11, wherein said second stop means comprises a displaceable flap resiliently mounted on said guide.

13. A print head transport mechanism as claimed in claim 10, wherein said first stop means comprises a displaceable flap resiliently mounted on said guide.

14. A print head transport mechanism as claimed in claim 2, wherein said guide includes an extension track extending beyond said print-receiving area into a service station area.

15. A print head transport mechanism as claimed in claim 2, wherein said guide includes an extension track extending beyond said print-receiving area into a service station area, said extension track comprising an extension of said first branch track and being operative to maintain said sub-carriage in said first index position when said carriage is traversed in said first and second directions to and from said service station area.

* * * * *